Aug. 15, 1944.   C. R. WASEIGE   2,355,764
RETRACTABLE LANDING GEAR FOR AIRCRAFT
Original Filed Aug. 24, 1938
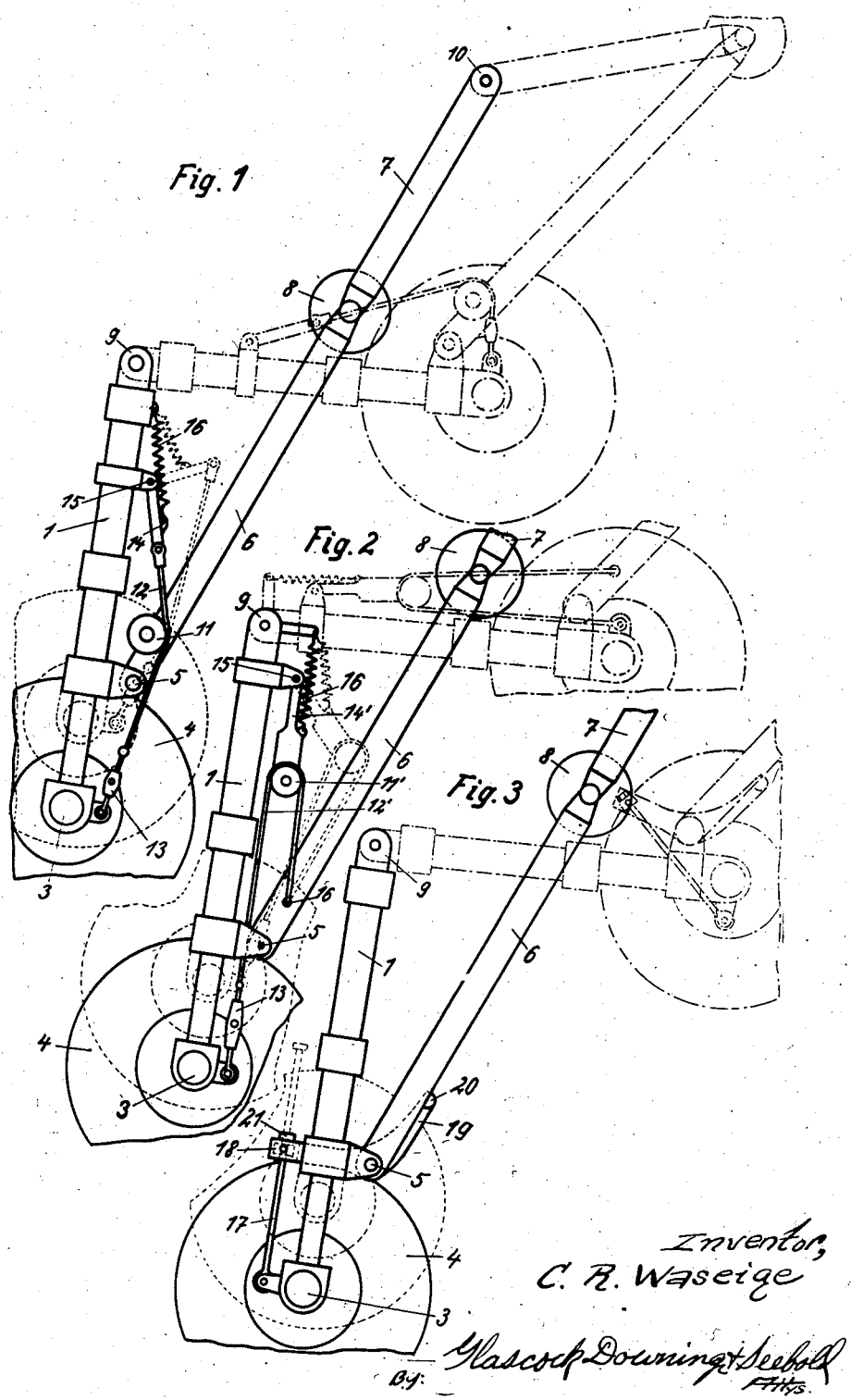

Patented Aug. 15, 1944

2,355,764

UNITED STATES PATENT OFFICE 2,355,764

RETRACTABLE LANDING GEAR FOR AIRCRAFT

Charles Raymond Waseige, Rueil, France; vested in the Alien Property Custodian

Original application August 24, 1938, Serial No. 226,569. Divided and this application August 4, 1939, Serial No. 288,462. In France September 10, 1937

11 Claims. (Cl. 244—102)

My present application which is a division from my co-pending application, Serial No. 226,569, relates to retractable landing gears for aircraft.

By landing gear, is to be understood herein the assembly formed by any element which is intended to come into contact with the ground, such as a single wheel or a train of wheels, a ski, a float, its supporting frame and its shock-absorber or shock-absorbers, which will hereinafter be called landing shock-absorbers.

An object of my invention is to provide a landing gear, the retractable structure of which includes a resilient strut tensioned during retraction movement and giving assistance to the extension operation of the gear.

Another object of my invention is to use for forming said resilient means the landing shock absorber itself, of the pneumatic or oleo-pneumatic type.

A further object of my invention is the provision of a resilient and braking strut active both to give assistance to the extension operation of the gear and to brake the speed of the said operation.

A further object of my invention is to provide a landing gear with resilient means adapted to give assistance to the end of the retraction operation of the gear.

A still further object of my invention is to provide a landing gear of reduced weight and adapted to occupy a small place.

Other objects and advantages of my invention will appear from the following description.

By way of nonlimitative examples, various embodiments of my invention applied to the same type of landing gear have been shown in the accompanying drawing.

In said drawing, Figs. 1 to 3 are diagrammatical side elevations of the landing gear.

In the three exemplary embodiments shown, the landing gear of a known type comprises two oleo-pneumatic landing shock-absorbers 1 disposed in parallel relationship to each other. Each of said shock absorbers include as known, two telescopic co-acting portions, the relative movement of which in one direction compresses air and accumulates energy and in the other direction expends such energy, the oil contained in the shock absorber being active to brake the relative movement of the co-acting portions in the said other direction. The lower part of the shock-absorbers 1 are braced by an axle 3 carrying a landing wheel 4. The shock-absorbers are pivoted at their upper end to a stationary stud 9 for retraction by rearward and upward swinging. On the movable lower part of each shock-absorber 1 is pivoted at 5 a hinged member 6. The hinged member 6 forms one of the arms 6 of a folding strut the other arm 7 of which is pivoted to a stationary stud 10. When the folding strut 6, 7 is extended, the landing gear is in its landing position illustrated in full lines. When the folding strut is being folded the landing gear gets retracted and comes to the position shown in dot-and-dash lines.

The extension and the folding of the folding strut are produced by any known means, herein shown as a driving joint 8 of the type described in my Patent 2,148,972.

In the exemplary embodiment of my invention shown in Fig. 1, each bar 6 of the folding strut carries a loose pulley 11 over which passes a flexible bond 12, a chain or a cable, which is connected on the one hand to the lower movable part of the corresponding shock-absorber 1, preferably by means of a tightener 13, and on the other hand to a connecting rod 14 which is pivoted at 15 on the upper part of the shock-absorber and is constantly urged to rotate by a spring 16.

The operation of this device is as follows:

During its movement when the aeroplane comes into contact with the ground, or while it is rolling along the ground, and the shock-absorber 1 shortens under an impact, the lower point of connection of the bond 12 moves towards the pulley 11 but said bond 12 remains taut owing to the fact that the spring 16 causes the connecting rod 14 to rotate on its pin 15 and pulls the whole of the bond upwards; this movement of the bond 12 as a whole has the sole effect of rotating the loose pulley 11. When the shock-absorber expands, it causes the bond 12 to move back downwards and to thereby rotate the connecting rod 14 against the action of the spring 16.

On closing of the folding strut 6, 7 to retract the landing gear, a relative movement of the lower arm 6 of the folding strut and of the shock-absorber 1 occurs, said arm 6 tending to move away from the shock-absorber. This causes the pulley 11 to bear on the bond and compels it to bend, moving its two points of connection towards each other therefore tensioning the shock-absorber 1. It can be readily seen that during the retracting, an instant occurs from which the arm 6 tends to move towards the shock-absorber 1 so that said shock-absorber partially expands and pulls the bond 12 which then presses against the pulley 11 and so helps to complete the retraction of the landing gear. When the landing gear is being lowered, the previous operation is repeated in the reverse direction; the shock-absorber begins to brake the lowering by tensioning itself to the extent it had been tensioned during the retracting, then expands thereafter, thereby helping the end of the lowering.

In the exemplary embodiment of Fig. 2, the loose pulley 11' is carried by the connecting rod 14' instead of being fixed on the lower arm 6 of the folding strut, as in the example of Fig. 1, and the bond 12' is attached to said arm at 16 after passing over the pulley 11' instead of being fixed to the connecting rod 14'. The operation is absolutely similar to that of the device of Fig. 1, but it will be observed that the pull of the bond on the movable lower part of the shock-absorber is effected along directions which deviate much less from a line parallel with the axis of the shock-absorber than in the case of Fig. 1. On the other hand, it can easily be seen that according to the position of the connecting point 16 of the bond on the lower arm 6 of the folding strut, the movement of the movable part of the shock-absorber during the retracting or the lowering will or will not have a dead centre which divides its total travel into two successive sections: one resisting and the other driving.

In the exemplary embodiment of Fig. 3, a rigid rod 17 is pivoted on the movable part of the shock-absorber and extends parallel with the axis of the latter; its upper end passes freely through a guiding sleeve 18 which is carried by a finger 19 in such a manner that it can rotate about a horizontal axis. Said finger 19 carries an extension 20 which is in contact with the rear face of the lower arm 6 of the folding strut, and, beyond said sleeve, an abutment 21 is fixed on said rod 17. When the shock-absorber oscillates and the impact during the landing or while the aeroplane is rolling along the ground, the rod 17 slides freely in the sleeve 18 and the usual operation of the shock-absorber is in no way modified. When the folding strut 6, 7 closes to retract the landing gear, the finger 19 which is displaced by its extension 20 participates in the relative rotary movement which occurs between the arm 6 and the shock-absorber 2 and bears on the abutment 21, thereby causing the movable part of the shock-absorber to slide by means of the rod 17 and tensioning the shock-absorber. In this case again, the travel of the movable part of the shock-absorber during the retracting and the lowering of the landing gear may or may not have a dead centre, a fact which depends on the position of the finger 19.

While I have described what I at present consider preferred embodiments of my invention, it will be obvious to those skilled in the art that various changes and modifications may be made therein without departing from the spirit and scope thereof. I aim in the appended claims to cover all such modifications and changes.

What I claim is:

1. Retractable landing gear for aircraft comprising a shock absorber adapted to deflect under ground impact, said shock absorber comprising coacting relatively movable portions, a wheel movable with one of said portions, an axle carried by the other portion, a folding strut pivoted about said axle and mounted to move both with and with respect to said shock absorber during extension and retraction strokes of the landing gear, a guiding sleeve pivoted about said axle and mounted to rotate with said strut during the retraction stroke of the landing gear, a rigid rod pivoted on the said first named portion and passing through said guiding sleeve, an abutment fixed on said rigid rod and arranged to bear on said sleeve at the beginning of the retraction stroke of the landing gear, whereby effecting relative motion of said coacting portions and storing energy in said shock absorber, said energy being used to control the extension stroke of the landing gear.

2. In aircraft, a retractable landing gear comprising a variable length shock-absorber, said shock-absorber including a pair of telescopic coacting portions, movable both with and with respect to each other, a hinged member mounted to effect reversed movements relatively to the said shock-absorber during extension and retraction operations respectively of the landing gear, means for retracting said landing gear, transmission means between the said two portions and the said member active to alter the length of the shock-absorber in the direction corresponding to the storage of energy in the same responsive to at least the most part of the retraction operation of the landing gear and to communicate anew the energy thus stored to the landing gear to supplement the action of gravity during the extension of the landing gear while decelerating the speed of such extension.

3. In aircraft, a retractable landing-gear comprising a variable length shock-absorber including a pair of telescopic co-acting portions movable both with and with respect to each other, a hinged member mounted to effect reversed movements relatively to said shock-absorber during extension and retraction operations respectively of the landing gear, means for retracting said landing gear, transmission means between the said portions and the said member active to alter the length of the shock-absorber in the direction corresponding to storage energy in the same responsive to at least the most part of the retraction operation of the landing gear and to communicate anew the energy thus stored to the gear to supplement the action of gravity for the extension of the landing gear, said transmission means including a pair of connected members capable of loose movements relative to each other during variations in the length of the shock-absorber due to landing shocks.

4. In aircraft, a retractable landing gear comprising a variable length shock-absorber including a pair of telescopic coacting portions movable both with and with respect to each other, a hinged member mounted to effect reversed movements relatively to said shock-absorber respectively during extension and retraction operations of the landing gear, means for retracting the landing gear, transmission means between said two portions and said member operative to move relatively the said coacting portions in the direction corresponding to the storage of energy in the shock-absorber responsive to the most part of the retraction operation and to allow a small relative displacement of said portions in the other direction at the end of the retraction whereby helping the said end and to restore the energy thus stored to the gear to supplement the action of gravity for the extension operation.

5. A retractable landing gear as claimed in claim 2 in which said hinged member is constituted by the lower arm of a folding strut hinged to said shock-absorber and to a stationary stud respectively.

6. A retractable landing gear as claimed in claim 2 in which said hinged member is an arm of a folding strut the two arms of which are respectively hinged to the shock absorber and to a stationary pivot.

7. A retractable landing gear for aircraft comprising a retractable structure and supporting a landing element, a shock absorber strut forming part of said structure and connected to the landing element to vary its length under the action of landing shocks, means for retracting said structure, a member with respect to which the shock absorber strut effects reversed movements during extension and retraction of the landing gear, transmission means in operative connection with said shock absorber strut and said member in a manner to alter the length of said shock absorber strut in the direction corresponding to the accumulation of energy therein in response to at least a part of the retraction movement of the landing gear and return the energy thus accumulated to the landing gear to give assistance to the extension movement thereof, said transmission including a member capable of lost motion during variations of the length of the shock absorber while the landing gear is in the extended position whereby said transmission means is ineffective to influence the length of the shock absorber strut in the extended position of the landing gear.

8. In a retractable landing gear for aircraft comprising an oleo-pneumatic landing shock absorber comprising an upper part and a lower part movable relative to the upper part, a retractile member movably connected to said upper part and arranged to move relative thereto during retraction of the landing gear, kinematic means connecting the retractile member and the lower part of the shock absorber in a manner to produce displacement of said lower part of the shock absorber relative to the upper part of the shock absorber and thereby energize said shock absorber, said kinematic means including a substantially inextensible band having bearing on at least three points on the upper and lower parts of the shock absorber and on the retractile member, respectively, at least one of said bearing points consisting of a loose pulley over which said band is trained, and resilient means carried by the landing gear and tensioning said band in the landing position of said landing gear regardless of the relative positions of the upper and lower parts of the shock absorber.

9. In a retractible landing gear for aircraft comprising an oleo-pneumatic landing shock absorber comprising an upper part and a lower part movable relative to the upper part, a retractile member movably connected to said upper part and arranged to move relative thereto during retraction of the landing gear, kinematic means connecting the retractile member and the lower part of the shock absorber in a manner to produce displacement of said lower part of the shock absorber relative to the upper part of the shock absorber and thereby energize said shock absorber, said kinematic means including a substantially inextensible band having its ends attached to said upper and lower parts of the shock absorber, a loose pulley carried by said retractile member and over which said band is trained, and resilient means connecting an intermediate portion of said band to the upper part of the shock absorber in a manner to keep the band tensioned in the landing position of the landing gear regardless of the relative positions of the upper and lower parts of the shock absorber.

10. In a retractible landing gear for aircraft comprising an eleo-pneumatic landing shock absorber comprising an upper part and a lower part movable relative to the upper part, a retractile member movably connected to said upper part and arranged to move relative thereto during retraction of the landing gear, kinematic means connecting the retractile member and the lower part of the shock absorber in a manner to produce displacement of said lower part of the shock absorber relative to the upper part of the shock absorber and thereby energize said shock absorber, said kinematic means including a substantially inextensible band having one end attached to the lower part of said shock absorber, an arm pivoted on the upper part of the shock absorber, a loose pulley carried by said arm over which the band is trained, with the remaining end of the band attached to said retractile member, and resilient means urging said arm to keep the band tensioned in the landing position of the landing gear regardless of the relative positions of the upper and lower parts of the shock absorber.

11. In an aircraft, a retractible landing gear comprising a variable length shock absorber comprising a pair of telescopic coacting upper and lower parts movable together and with respect to each other, a hinged strut pivotally connected at one end to said upper part of the shock absorber and pivoted to a support at its other end, the hinged portions of the strut being arranged for reversed movement during extension and retraction of the landing gear, means for retracting the landing gear, transmission means connected with the upper and lower parts of the shock absorber and with a hinged portion of the hinged struts, in a manner to alter the length of the shock absorber in the direction corresponding to storage of energy in the shock absorber in response to at least a part of the retraction of the landing gear and to return the energy thus stored to the landing gear so as to supplement the force of gravity during extension of the landing gear.

CHARLES RAYMOND WASEIGE.